US011521388B2

(12) United States Patent
Ueda et al.

(10) Patent No.: US 11,521,388 B2
(45) Date of Patent: Dec. 6, 2022

(54) BALL GAME VIDEO ANALYSIS DEVICE AND BALL GAME VIDEO ANALYSIS METHOD

(71) Applicant: Panasonic Intellectual Property Management Co., Ltd., Osaka (JP)

(72) Inventors: Junko Ueda, Kanagawa (JP); Yuma Katayama, Kanagawa (JP); Masamoto Tanabiki, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/056,481

(22) PCT Filed: May 15, 2019

(86) PCT No.: PCT/JP2019/019212
§ 371 (c)(1),
(2) Date: Nov. 18, 2020

(87) PCT Pub. No.: WO2019/225415
PCT Pub. Date: Nov. 28, 2019

(65) Prior Publication Data
US 2021/0150220 A1   May 20, 2021

(30) Foreign Application Priority Data
May 21, 2018   (JP) .............................. JP2018-097086

(51) Int. Cl.
*G06T 7/292*   (2017.01)
*G06V 20/40*   (2022.01)

(52) U.S. Cl.
CPC .............. *G06V 20/42* (2022.01); *G06T 7/292* (2017.01); *G06T 2207/10016* (2013.01); *G06V 20/44* (2022.01)

(58) Field of Classification Search
CPC ..... G06K 9/00724; G06K 2009/00738; G06K 9/00201; G06K 2009/3291; G06T 7/292;
(Continued)

(56) References Cited

U.S. PATENT DOCUMENTS 6,371,849 B1 * 4/2002 Togami ................... A63F 13/56
273/317.1
2004/0017473 A1 * 1/2004 Marks ..................... G06F 3/017
348/207.1
(Continued)

FOREIGN PATENT DOCUMENTS

| JP | 2006-012012 A | 1/2006 | |
|---|---|---|---|
| JP | 2006012012 | * 1/2006 | ............... G06T 7/20 |
| WO | 2016/139906 A1 | 9/2016 | |

OTHER PUBLICATIONS

Hulstaert Lars, "A Beginner's Guide to Object Detection", Apr. 19, 2018, (provided by Applicant) (Year: 2018).*

(Continued)

*Primary Examiner* — Amara Abdi
(74) *Attorney, Agent, or Firm* — Pearne & Gordon LLP

(57) ABSTRACT

This ball game video analysis device: receives movie frames captured by cameras; computes the trajectory of the three-dimensional positions of a ball using the received multiple movie frames; determines, on the basis of a change in the ball trajectory, whether or not any action has been made by a player with respect to the ball; in the case when there has been such an action, selects, as an action frame, the movie frame corresponding to the timing at which said action was made; and identifies, from the action frame, a player who made that action.

7 Claims, 10 Drawing Sheets

(58) Field of Classification Search
CPC ........... G06T 2207/10016; G06T 2207/20221; H04N 7/181
See application file for complete search history.

(56) References Cited

U.S. PATENT DOCUMENTS

2014/0245367 A1* 8/2014 Sasaki et al. ...... H04N 21/2343
　　　　　　　　　　　　　　　　　　　　　　725/109
2017/0132470 A1* 5/2017 Sasaki ..................... G06T 15/30
2017/0337698 A1 11/2017 Ueda et al.

OTHER PUBLICATIONS

International Search Report issued in Patent Application No. PCT/JP2019/019212 dated Jul. 9, 2019.

Junliang Xing et al., "Multiple Player Tracking in Sports Video: A Dual-Mode Two-Way Bayesian Inference Approach With Progressive Observation Modeling", IEEE Transactions on Image Processing, Jun. 2011, pp. 1652-1667, vol. 20, No. 6.

Xina Cheng et al., "Multi-view 3D Ball Tracking with Abrupt Motion Adaptive System Model, Anti-occlusion Observation and Spatial Density based Recovery in Sports Analysis", IEICE Trans. Fundamentals, Jan. 2011, pp. 1-12, vol. E94-A, No. 1.

Extended European search report issued in European Patent Application No. 19806778.7 dated Jul. 7, 2021.

European Office Action issued in European Patent Application No. 19806778.7 dated Oct. 17, 2022.

Hulstaert Lars, "A Beginner's Guide to Object Detection", Apr. 19, 2018, XP055811879, Retrieved from the Internet: URL:https://www.datacamp.com/community/tutorials/object-detection-quide, retrieved on Jun. 8, 2021.

* cited by examiner

| FRAME TIME | BALL COORDINATES (x, y, z) | BALL SPEED (km/h) | ACTION TYPE | ACTOR NUMBER |
|---|---|---|---|---|
| ... | ... | ... | ... | ... |
| T−3 | ... | ... | ... | ... |
| ... | ... | ... | ... | ... |
| T | $(x_T, y_T, z_T)$ | $S_T$ | ATTACK | 14 |
| ... | ... | ... | ... | ... |
| T+3 | ... | ... | ... | ... |
| ... | ... | ... | ... | ... |

BALL GAME VIDEO ANALYSIS DEVICE AND BALL GAME VIDEO ANALYSIS METHOD

TECHNICAL FIELD

The present disclosure relates to a ball game image analysis apparatus, and a ball game image analysis method.

BACKGROUND ART

Data obtained by tracking movements of players during sports games has been used for developing a team strategy, providing information to sports audiences and the like. Today, since such data is manually obtained by analysts, it is time-consuming, and automation using apparatuses is desired. For example, NPL 1 discloses a technique of automatically tracking movements of a plurality of players from images in which a sports game is captured.

CITATION LIST

Non-Patent Literature

NPL 1

Junliang Xing, Haizhou Ai, Liwei Liu, and Shihong Lao "Multiple Player Tracking in Sports Video: A Dual-Mode Two-Way Bayesian Inference Approach With Progressive Observation Modeling", IEEE TRANSACTIONS ON IMAGE PROCESSING, VOL. 20, NO. 6, June 2011

NPL 2

Xina CHENG, Norikazu IKOMA, Masaaki HONDA and Takeshi IKENAGA "Multi-view 3D Ball Tracking with Abrupt Motion Adaptive System Model, Anti-occlusion Observation and Spatial Density based Recovery in Sports Analysis", IEICE TRANS. FUNDAMENTALS, VOL. E94-A, NO. 1 January 2011

SUMMARY OF INVENTION

Technical Problem

However, when the movements of all players during a sports game are tracked as in NPL 1, the processing load is high and detection errors are likely to occur. In a ball game, it is important to identify a player who has performed an action for a ball, and it is not always necessary to track the movements of all players.

A nonlimitative aspect of the present disclosure provides a ball game image analysis apparatus and a ball game image analysis method that recognize a player who has performed an action for a ball from a captured image of a ball game.

Solution to Problem

A ball game image analysis apparatus according to an aspect of the present disclosure is configured to analyze an image of a ball game, the ball game image analysis apparatus including an image receptor configured to receive a plurality of moving image frames of the ball game captured by a plurality of cameras located at different positions; a trajectory calculator configured to calculate a trajectory of a moving body for the ball game by using the plurality of moving image frames; an action determiner configured to determine whether an action is taken for the moving body by a player of the ball game on a basis of a change of the trajectory of the moving body; an action frame selector configured to select, as an action frame, a moving image frame of a timing when the action is taken from among the plurality of moving image frames, when the action is taken; and an actor recognizer configured to recognize, from the action frame, a player who has performed the action.

Note that these comprehensive or detailed aspects may be achieved as systems, methods, integrated circuits, computer programs or recording mediums, and may be achieved as given combinations of systems, apparatuses, methods, integrated circuits, computer programs and recording mediums.

Advantageous Effects of Invention

According to an aspect of the present disclosure, a player who has performed an action for a ball can be recognized from a captured image of a ball game.

Advantages and effects of aspects of the present disclosure are further detailed in the specification and drawings. The advantages and/or effects are provided by the features described in the embodiments and the specification and drawings, but it is not necessary to provide all of them to achieve one or more features.

BRIEF DESCRIPTION OF DRAWINGS

FIG. 3 illustrates an example of an analysis result information according to the embodiment;

DESCRIPTION OF EMBODIMENTS

Figure 1:
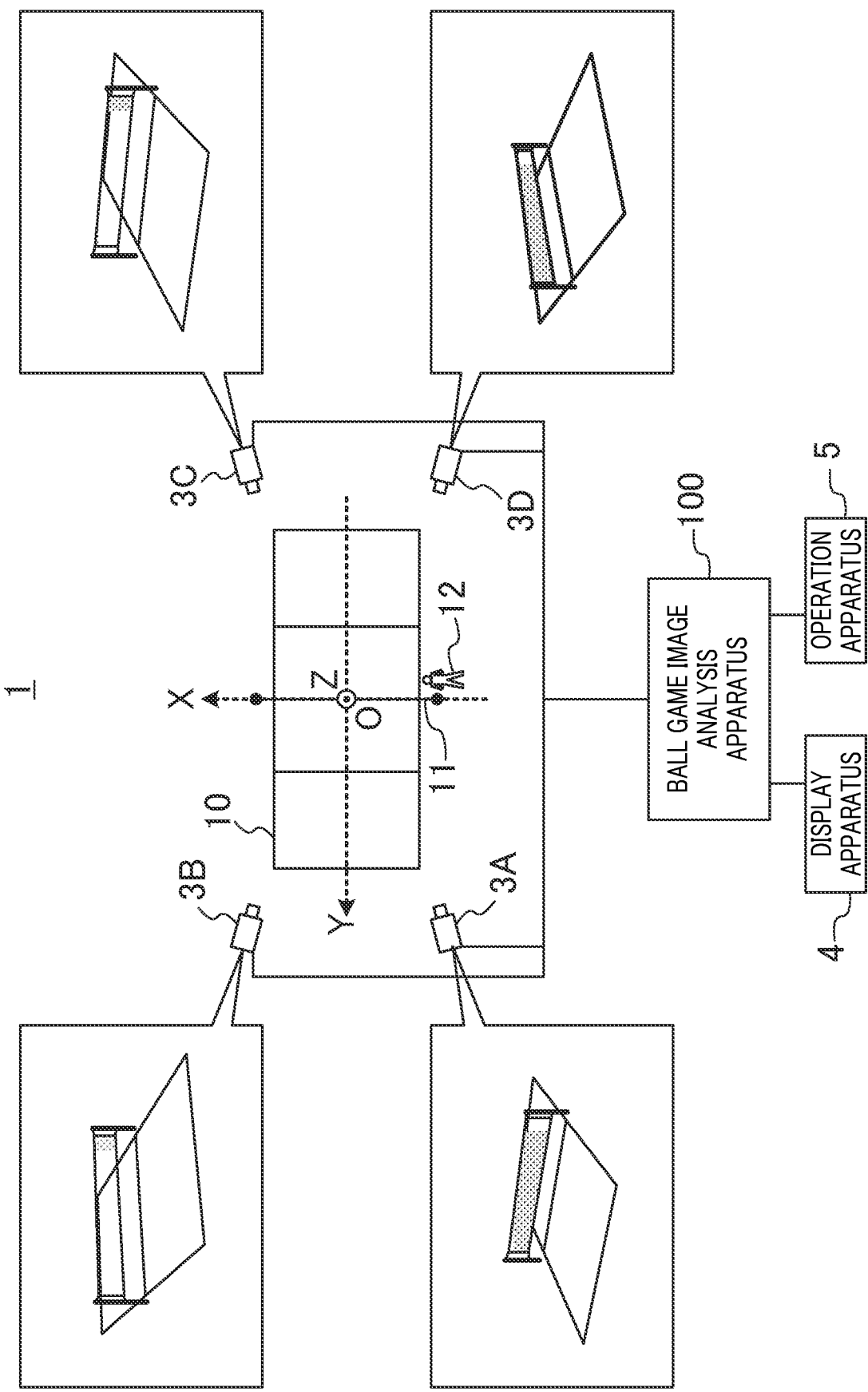
FIG. 1 illustrates an overview of a ball game image analysis system according to an embodiment.

An embodiment of the present invention is described in detail below with reference to drawings appropriately. It should be noted that unnecessarily detailed descriptions may be omitted. For example, the detailed description for well-known matters and the overlapping description for substantially identical configurations may be omitted for the purpose of avoiding excessively redundant descriptions and facilitating the understanding of a person skilled in the art.

Note that the accompanying drawings and the following description are intended to facilitate sufficient understanding of the present disclosure for a person skilled in the art, and the scope of the claims is not limited to the accompanying drawings and the following description.

In addition, reference signs such as "camera 3A" and "camera 3B" are used when elements of the same type are discriminated in the description, and the common number of reference signs such as "camera 3" is used when elements of the same type are not discriminated in the description.

Embodiment

Ball Game Image Analysis System

First, an overview of a ball game image analysis system according to an embodiment is described with reference to FIG. 1.

Ball game image analysis system 1 is a system that analyzes a captured image of a ball game and recognizes a player who has performed an action for a moving body used in the ball game. Typically, the moving body used in the ball game is a ball, but may be a shuttle used in badminton or the like. In the present embodiment, volleyball, which is a ball game, is described as an example. It should be noted that ball game image analysis system 1 may be applied to various ball games such as football, baseball, table tennis, basketball, tennis, rugby, American football, lacrosse, and badminton. In addition, ball game image analysis system 1 may be applied to moving bodies with shapes that do not fit the concept of "ball", such as ice hockey pucks. That is, ball game image analysis system 1 may be applied to any games in which the score or winner is determined by a team of a plurality of players performing actions for a moving body.

Ball game image analysis system 1 includes a plurality of cameras 3 (3A, 3B, 3C and 3D), display apparatus 4, operation apparatus 5, and ball game image analysis apparatus 100.

The plurality of cameras 3 is disposed at respective positions different from each other. For example, as illustrated in FIG. 1, cameras 3 are disposed at elevated positions where court 10 can be captured from different viewpoints (field angles). While four cameras 3 are provided in FIG. 1, the present embodiment is not limited to this, and the number of cameras 3 is not limited as long as two or more cameras are provided. With two or more cameras 3, the three-dimensional position of a ball can be calculated Each camera 3 is communicatively connected to ball game image analysis apparatus 100 in a wired or wireless manner. Each camera 3 captures scenes during a ball game to generate captured images. Then, each camera 3 generates a moving image frame from a plurality of captured images. Then, each camera 3 transmits the moving image frame to ball game image analysis apparatus 100. Moving image frame 201 (see FIG. 2) may be a frame obtained by compressing a plurality of captured images on the basis of a standard such as MP4, H.264, H.265, and Motion JPEG, for example.

Display apparatus 4, which is communicatively connected to ball game image analysis apparatus 100 in a wired or wireless manner, displays an image output from ball game image analysis apparatus 100. Display apparatus 4 is a liquid crystal display, an organic EL display or the like, for example.

Operation apparatus 5, which is communicatively connected to ball game image analysis apparatus 100 in a wired or wireless manner, receives a user's operation and transmits information on the operation to ball game image analysis apparatus 100. Operation apparatus 5 is a keyboard, a mouse, a microphone, a touch panel and/or the like, for example. Note that operation apparatus 5 and display apparatus 4 may be an integrated apparatus.

With a moving image frame captured at each camera 3, ball game image analysis apparatus 100 identifies a player who has performed an action for a ball. In volleyball, actions performed for a ball are serve, reception, dig, tossing, attack, block and the like. In the following description, a player who has performed an action for a ball may be referred to as "actor".

Note that in the present embodiment, as illustrated in FIG. 1, origin O is the center point on the floor surface of court 10, the X axis is an axis that is parallel to the floor surface of court 10 and net 11, the Y axis is an axis that is parallel to the floor surface of court 10 and perpendicular to net 11, and the Z axis is an axis that is perpendicular to the floor surface of court 10. Regarding the X axis, the direction away from referee 12 is the forward direction and the direction approaching referee 12 is the backward direction. Regarding the Y axis, as viewed from referee 12 facing court 10, the left direction is the forward direction and the right direction is the backward direction. Regarding the Z axis, the direction away from the floor surface of court 10 is the forward direction. That is, a coordinate z of the Z axis corresponds to a height from the floor surface of court 10.

Ball Game Image Analysis Apparatus

Figure 2:
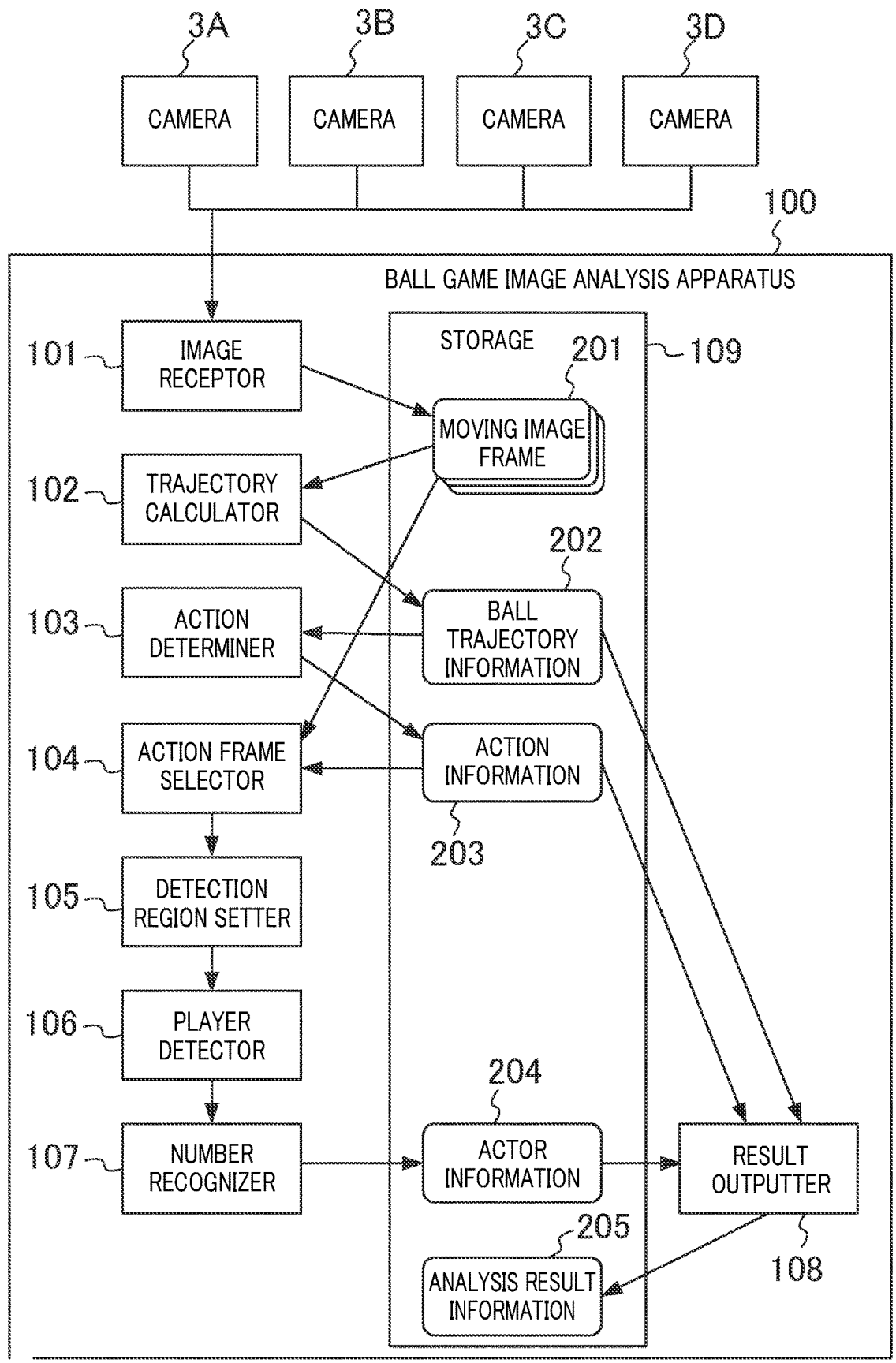
FIG. 2 illustrates an example of a configuration the ball game image analysis apparatus according to the embodiment.

Next, ball game image analysis apparatus 100 is described with reference to FIG. 2.

Ball game image analysis apparatus 100 includes image receptor 101, trajectory calculator 102, action determiner 103, action frame selector 104, detection region setter 105, player detector 106, number recognizer 107, result outputter 108, and storage 109.

Image receptor 101 receives moving image frame 201 transmitted from each of cameras 3A to 3D, and stores it in storage 109.

Trajectory calculator 102 applies a method disclosed in NPL 2 to a plurality of moving image frames 201 stored in storage 109 to calculate the three-dimensional position (x, y, z) and the speed of the ball at the time when moving image frame 201 is captured (hereinafter referred to as "frame time"), for example. Then, trajectory calculator 102 generates ball trajectory information 202 by correlating the frame time, and the three-dimensional position and the speed of the ball with one another, and stores it in storage 109.

Action determiner 103 determines whether an action for the ball has been taken from ball trajectory information 202. When it is determined that an action has been taken, action determiner 103 generates action information 203 by correlating the frame time (hereinafter referred to as "action frame time") when the action is taken with the type of the action, and stores it in storage 109. Note that details of action determiner 103 are described later.

From among the plurality of moving image frames 201 stored in storage 109, action frame selector 104 selects, as action frames, a moving image frame corresponding to the action frame time included in action information 203, and a moving image frame corresponding to a frame time in the proximity of the action frame time. Details of action frame selector 104 are described later.

For the action frame selected by action frame selector 104, detection region setter 105 sets a detection region, which is a region where detection of a player is performed. Note that details of detection region setter 105 are described later.

Player detector 106 detects a region in which a player is captured (hereinafter referred to as "player region") from the image in the detection region set by detection region setter 105. Then, when player detector 106 detects a plurality of player regions, the player detector 106 selects, as an actor region, the player region in which the player (actor) who has performed an action is captured. Note that details of player detector 106 are described later.

Number recognizer 107 recognizes the uniform number of the actor from the image in the actor region detected by player detector 106. Then, number recognizer 107 generates actor information 204 by correlating the action frame time with the recognized uniform number of the actor, and stores it in storage 109. Note that details of number recognizer 107 are described later.

Result outputter 108 generates analysis result information 205 by correlating ball trajectory information 202, action information 203, and actor information 204, and stores it in storage 109. For example, in the case where action frame time T and an action type "attack" are correlated with each other in action information 203, and action frame time T and the uniform number "14" of the actor are correlated with each other in actor information 204, result outputter 108 generates analysis result information 205 as illustrated in FIG. 3. Specifically, result outputter 108 generates analysis result information 205 in which the action type "attack" and the uniform number "14" of the actor are correlated with each other for frame time T of ball trajectory information 202 as illustrated in FIG. 3. In this manner, with analysis result information 205, the user or other apparatuses can know that the player (actor) of the uniform number "14" has performed "attack" of a speed "ST (km/h)" for the ball at the three-dimensional position $(x_T, y_T, z_T)$ at frame time T.

Details of Action Determiner

Next, details of action determiner 103 are described.

Action determiner 103 calculates the ball trajectory from the three-dimensional position and the speed of the ball of each frame time included in ball trajectory information 202. Then, when the calculated trajectory change of the ball matches a predetermined condition, action determiner 103 determines that an action has been taken for the ball. Then, when action determiner 103 is determined that an action has been taken, action determiner 103 sets the frame time that matches the condition as the action frame time.

Note that action determiner 103 may determine the action type on the basis of the trajectory change of the ball, the three-dimensional position and the speed of the ball, the rule of the ball game and the like. Action types of volleyball include serve, reception, dig, tossing, attack, and block. For example, when the trajectory of the ball that is detected first after the start of the analysis has a movement component of the Y-axis direction (the long side direction of the court illustrated in FIG. 1) and the speed component of the ball in the Y-axis direction is within a predetermined range, action determiner 103 determines that the action type is "serve". For another example, when the trajectory of the ball after "serve" extends across the coordinate of net 11 in the Y axis, and the three-dimensional position of the ball has changed from a downward movement to an upward movement (i.e., the change in the coordinate in the Z-axis direction has become plus), action determiner 103 determines that the action type is "reception". In the rule of volleyball, an action of receiving "serve" is "reception", and thus "reception" and "dig" can be distinguished from each other by making a determination based on that rule.

Likewise, when the trajectory change of the ball and the like match a predetermined condition, action determiner 103 determines other action types on the basis of the determination criteria under the rule of the game.

While the occurrence of an action is determined using three-dimensional information in the above-mentioned case, two or one dimensional information may be used to determine the occurrence of the action. For example, determination of the occurrence of "serve" under the above-described condition can be made using the analysis start time and the information of the Y-axis direction without using information of the X-axis direction and the Z-axis direction.

In addition, action determiner 103 may generate action information 203 by further correlating, to the action frame time and the action type, the three-dimensional position of the ball corresponding to the action frame time. The reason for this is that information on the three-dimensional position of the ball is used in action frame selector 104 described later and the like.

Details of Action Frame Selector

Next, details of action frame selector 104 are described.

First, action frame selector 104 selects at least two cameras 3 closer to the three-dimensional position of the ball corresponding to the action frame time. For example, action frame selector 104 selects cameras 3A and 3B when the y-coordinate of the ball is 0 or greater (when the ball is located on the left side in court 10 of FIG. 1), whereas action frame selector 104 selects cameras 3C and 3D when the y-coordinate of the ball is smaller than 0 (when the ball is located on the right side in court 10 of FIG. 1). In this manner, camera 3 that is highly likely to have captured the uniform number of the player's uniform is selected.

In addition, action frame selector 104 selects, as the action frames, moving image frame 201 corresponding to action frame time T of action information 203, moving image frame 201 corresponding to a frame time prior to action frame time T (e.g., frame time T−3), and moving image frame 201 corresponding to a frame time posterior to action frame time T (e.g., frame time T+3) from moving image frames 201 of cameras 3 selected in the above-described manner.

In this manner, even if the uniform number of the actor cannot be recognized in one action frame, the uniform number of the actor may be recognized in another action frame by selecting a plurality of action frames. That is, the possibility that the uniform number of the actor can be recognized increases.

In addition, even if the uniform number of the actor cannot be recognized in one action frame, the uniform number of the actor whose posture has been changed may be recognized in another action frame by selecting moving image frames 201 separated by two or more frames as action frames as described above. That is, the possibility that the uniform number of the actor can be recognized increases.

Note that the configuration in which the moving image frames selected as the action frames are separated by two or more frames is just an example. Moving image frames 201 separated by three or more frames or moving image frames 201 separated by only one frame may also be extracted as the action frames as long as the actor's posture has been changed and a plurality of frames in which the actor is highly likely to be captured can be extracted. It should be noted that, when it is excessively separated from action frame time T, the possibility that the actor who has performed the action goes out of moving image frame 201 increases. Accordingly, for example, in the case of moving image frame 201 corresponding to a moving image of 60 fps, the maximum interval between frames is preferably approximately 10 frames.

In addition, action frame selector 104 may determine the interval, from action frame time T, of moving image frame 201 to be extracted as the action frame in accordance with the value of the frame rate of the original moving image of the moving image frame. For example, since two frames of 60 fps correspond to one frame of 30 fps, action frame selector 104 selects moving image frames 201 separated by two frames in the case of 60 fps, whereas action frame selector 104 selects moving image frames 201 separated by one frame in the case of 30 fps. In this manner, even with different fps, moving image frames 201 corresponding to approximately equivalent actual times can be extracted as the action frames.

In addition, action frame selector 104 may change the interval frame between moving image frames 201 to be selected as the action frames in accordance with the type of the action determined by action determiner 103. In ball games, various actions are performed, and the changeability of the actor's posture differs depending on the actions. Therefore, if the action frames selected for an action that entails a large posture change are excessively separated from each other, moving image frame 201 in which the actor is not captured may possibly selected as the action frame. On the other hand, when the action frames selected for an action in which the posture is less likely to be changed are excessively close to each other, moving image frames 201 in which the actor having substantially the same posture is captured may possibly be selected as the action frames, and then there is a risk that the uniform number cannot be recognized in all action frames. In view of this, action frame selector 104 selects the action frame such that the larger the actor's posture change in the action, the closer moving image frame 201 to be selected as the action frame to action frame time T, and that the smaller the actor's posture change in the action, the farther moving image frame 201 to be selected as the action frame from action frame time T.

In this manner, occurrence of the above-mentioned problems can be reduced. In addition, ball game image analysis apparatus 100 may manually accept, from the user, the setting for determining the smallest interval frame of moving image frame 201 to be selected as the action frame. Since it is difficult to completely automatically anticipate the degree of the change of the actor's posture even for the same action, the configuration in which the criteria for selecting the action frame can be changed on the basis of the user's determination is useful.

Note that the present embodiment can be achieved even with a configuration in which action frame selector 104 does not perform the process of selecting moving image frame 201 corresponding to the frame time prior to or posterior to action frame time T as the action frame. In addition, the number of moving image frames 201 selected by action frame selector 104 as the action frames may be increased or reduced. In addition, action frame selector 104 may not uniformly select the moving image frames from the frame time prior to action frame time T and the frame time posterior to action frame time T, and may select the action frames corresponding to one of the prior frame time and the posterior frame time.

Details of Detection Region Setter

Next, details of detection region setter 105 are described.

Detection region setter 105 sets a detection region corresponding to the three-dimensional position of the ball at action frame time T for each action frame selected by action frame selector 104. Next, a setting of a detection region in volleyball is described with reference to FIGS. 4 and 5.

Figure 4:
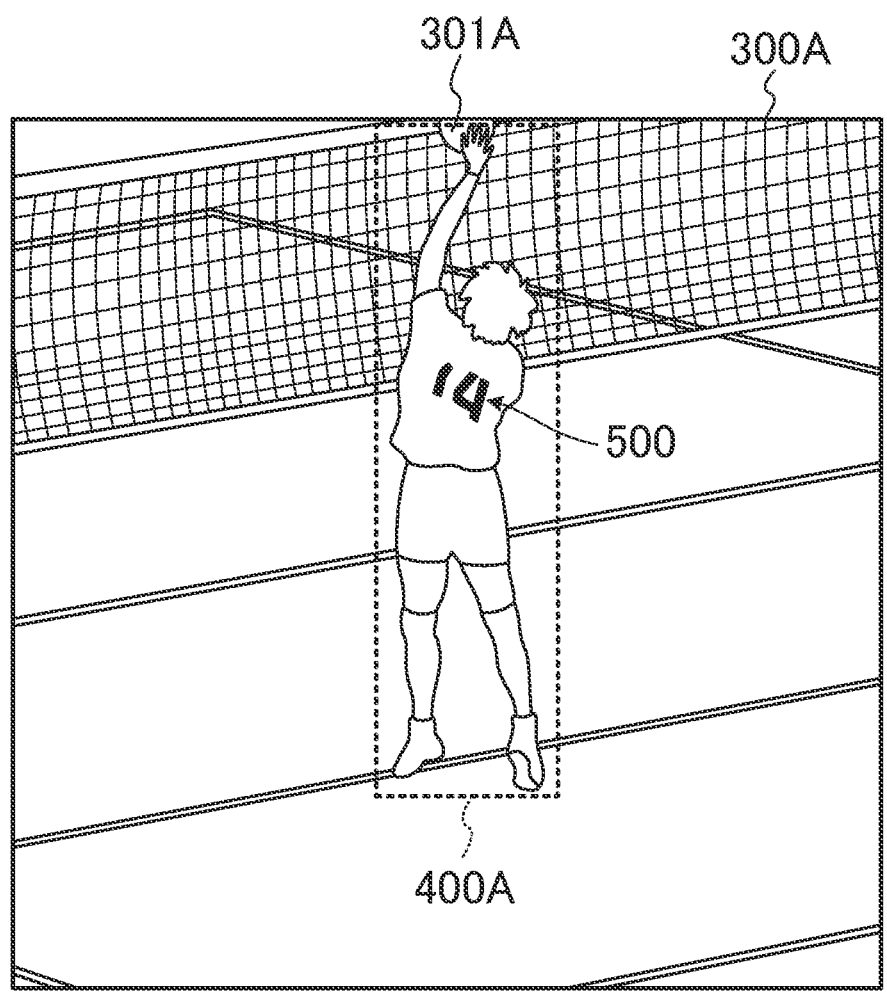
FIG. 4 illustrates an example of a detection region and an actor region according to the embodiment.

When the coordinate z (height) of the ball at action frame time T is equal to or greater than a predetermined threshold value (e.g., 2 m), detection region setter 105 sets detection region 300A for the action frame such that ball image 301A is located at the center of the upper side (upper end) of detection region 300A as illustrated in FIG. 4. The reason for this is that when the coordinate z (height) of the ball is equal to or greater than the predetermined threshold value, it is highly possible that the actor is located below the ball. Note that detection region 300A may be set such that ball image 301A is located at a position slightly shifted from the exact center of the upper side by one to several pixels. Such a position is encompassed in "the center of the upper side" in this specification.

Figure 5:
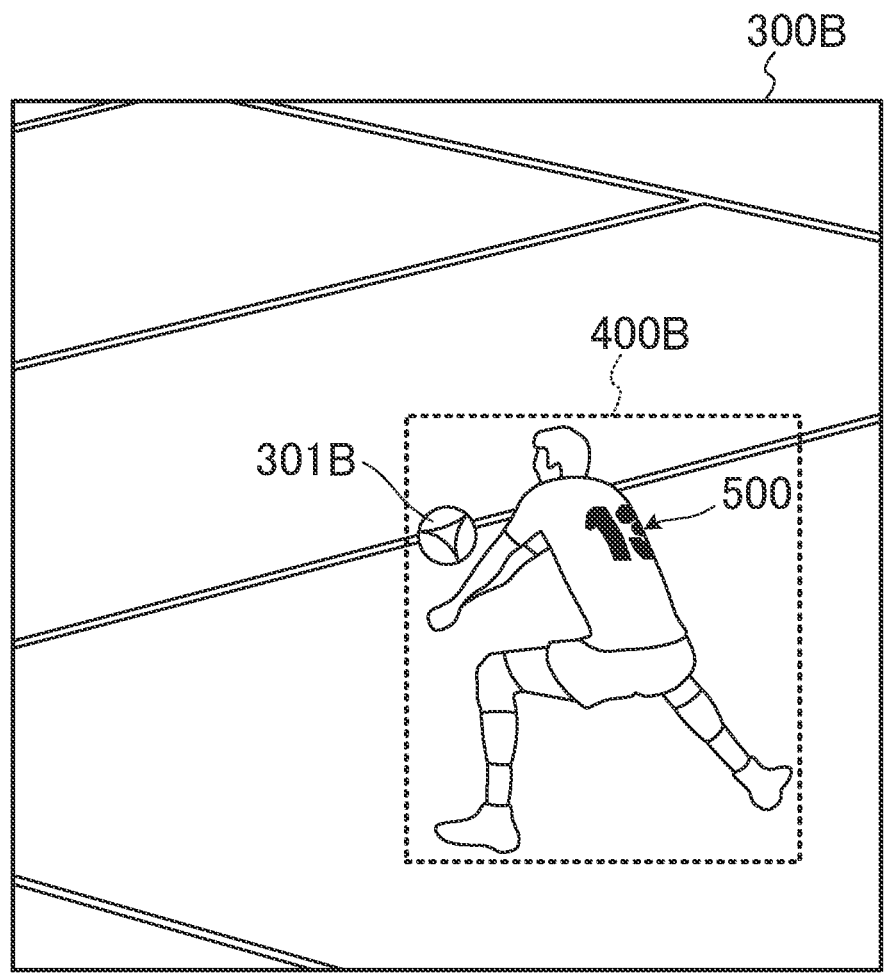
FIG. 5 illustrates another example of the detection region and the actor region according to the embodiment.

When the coordinate z (height) of the ball at action frame time T is smaller than the predetermined threshold value (e.g., 2 m), detection region setter 105 sets detection region 300B for the action frame such that ball image 301B is located at the center of detection region 300B as illustrated in FIG. 5. The reason for this is that when the coordinate z (height) of the ball is smaller than the predetermined threshold value, it is highly possible that the actor is located in the proximity of the ball. Note that detection region 300B may be set such that ball image 301B is located at a position shifted from the exact center by one to several pixels. Such a position is encompassed in "center" in this specification.

With the above-mentioned configuration in which detection region setter 105 sets setting detection region 300 and player detector 106 detects actor region 400 from detection region 300, the processing load is reduced and as a result the processing time is reduced in comparison with a case where the actor region is detected from the entire action frame. In this manner, ball game image analysis apparatus 100 can recognize the uniform number of the actor in substantially real time.

Note that it is preferable that the size of detection region 300 is slightly larger than the size occupied in the moving image frame by a player located closest to camera 3 during the game. The reason for this is that a player during the game has various postures such as widely opened legs and sliding, and that the movement length between frames are large.

Details of Player Detector

Next, details of player detector 106 are described.

First, player detector 106 detects a region in which a player (person) is captured (hereinafter referred to as "player region") from each detection region 300. For example, player detector 106 detects the player region from detection region 300 by using a model configured for player detection (neural network) that has learned a plurality of player images in the game through deep learning.

Next, player detector 106 selects, from the detected player region, the player region in which the actor is captured as the actor region. For example, in the case where one player region has been detected, player detector 106 selects that player region as actor region 400, whereas in the case where a plurality of player regions has been detected, player detector 106 selects one player region as actor region 400 through the following (A1) and (A2).

(A1) In the case where a plurality of player regions has been detected from the action frame at action frame time T, player detector 106 selects, as actor region 400, the player region closest to the three-dimensional position of the ball in the three-dimensional space at action frame time T.

(A2) In the case where a plurality of player regions has been detected from an action frame prior to action frame time T (e.g., frame time T−3) or an action frame posterior to action frame time T (e.g., frame time T+3), the player region closest to actor region 400 in the three-dimensional space selected in the (A1) is selected as actor region 400

Note that player detector 106 may estimate the posture of an actor in actor region 400 such that the actor region 400 is retained when it is estimated that the actor has a posture with his or her back to camera 3, and that the actor region 400 is deleted when it is estimated that the actor has other postures. In this manner, actor region 400 in which uniform number 500 is captured is retained and actor region 400 in which uniform number 500 is not captured is deleted, and thus, erroneous number recognition at number recognizer 107 is reduced.

Same Player Determination

Note that player detector 106 may determine whether actor regions 400 detected from action frames as described above have the same player. This determination process is hereinafter referred to as "same player determination process".

Figure 6A:
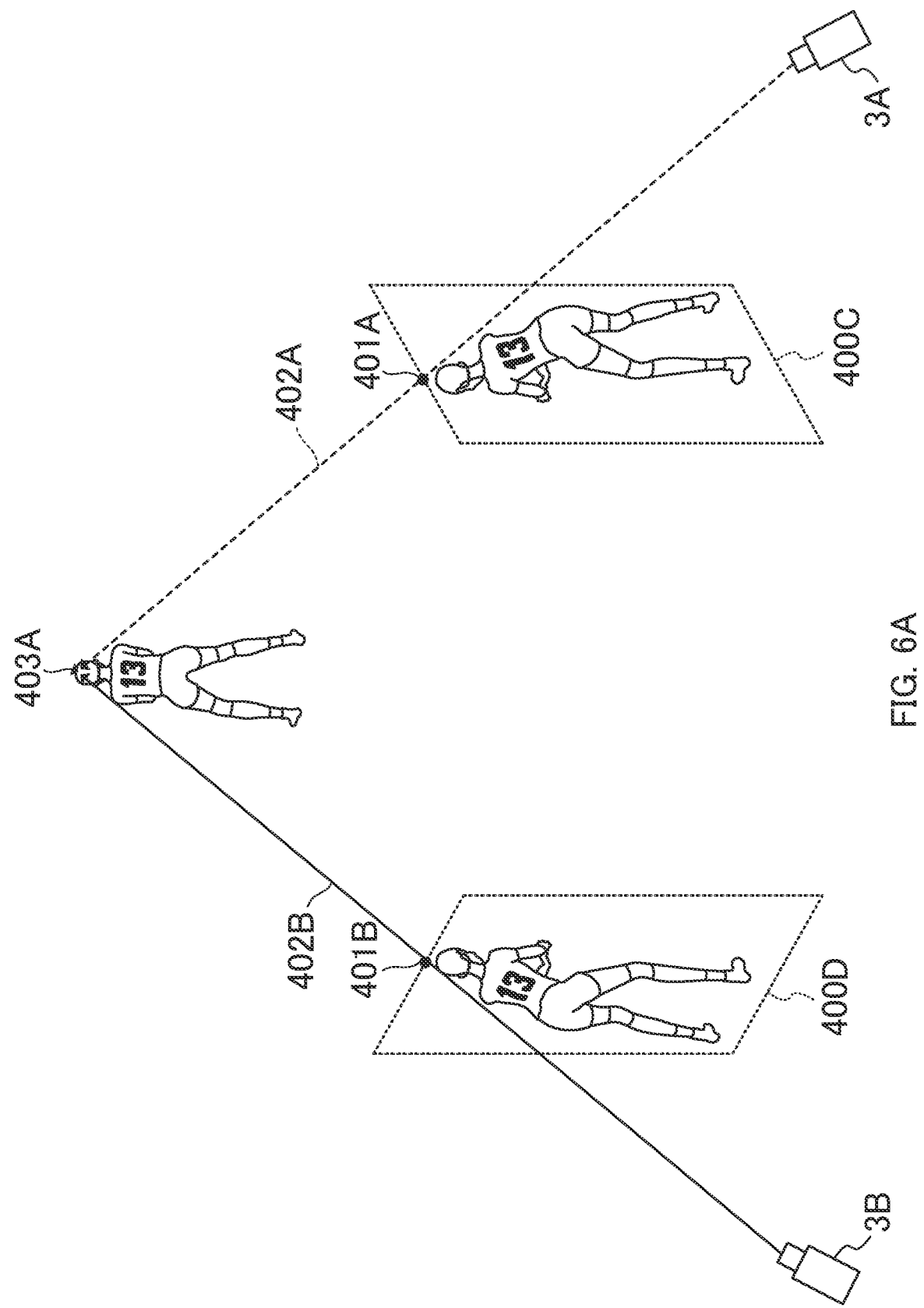
FIG. 6A illustrates a case where players are determined as the same player in a same player determination process according to the embodiment.
Figure 6B:
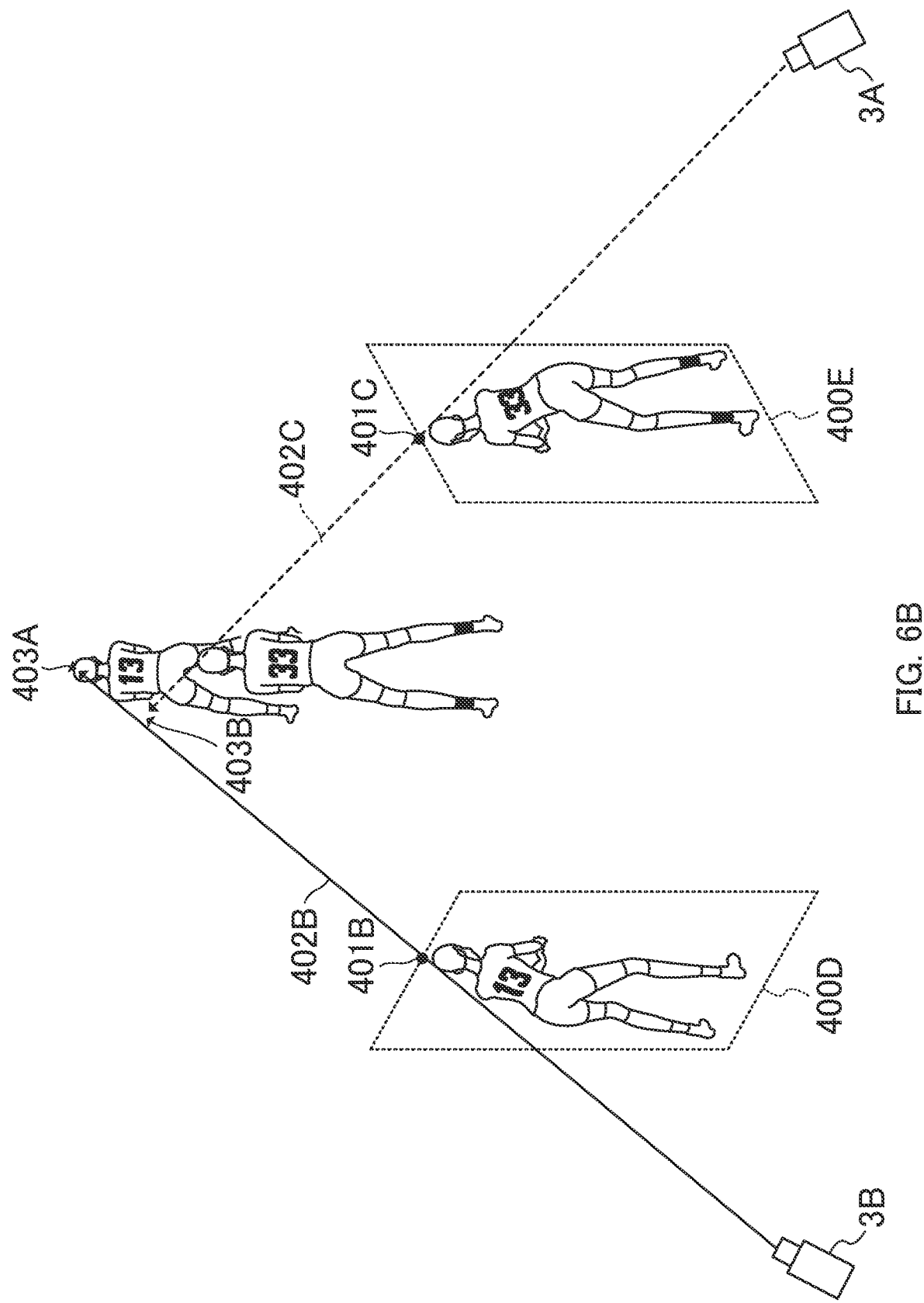
FIG. 6B illustrates a case where players are determined as different players in the same player determination process according to the embodiment.

Next, an example of the same player determination process is described with reference to FIGS. 6A and 6B. FIG. 6A illustrates a case where it is determined that frames have the same player, and FIG. 6B illustrates a case where it is determined that frames have different players.

First, as illustrated in FIG. 6A, player detector 106 calculates vector line 402A extending from the position of camera 3A to the position of center upper side 401A of actor region 400C detected from an action frame captured by that camera 3A at frame time t. Likewise, as illustrated in FIG. 6A, player detector 106 calculates vector line 402B extending from the position of camera 3B to the position of center upper side 401B of actor region 400D detected from an action frame captured by that camera 3B at frame time t.

Next, player detector 106 determines that actor region 400C and actor region 400D have the same player when minimum distance 403A between vector line 402A and vector line 402B is smaller than a predetermined threshold value, whereas player detector 106 determines that actor region 400C and actor region 400D have different players when the minimum distance 403A is equal to or greater than the predetermined threshold value. For example, in FIG. 6A, minimum distance 403A is smaller than the predetermined threshold value, and therefore player detector 106 determines that actor region 400C and actor region 400D have the same player. In FIG. 6B, on the other hand, minimum distance 403B is equal to or greater than the predetermined threshold value, and therefore player detector 106 determines that actor region 400D and actor region 400E have different players.

This determination is described below in more detail.

The same part of the same player is located at the same three-dimensional coordinates. Therefore, vector lines 402A and 402B ideally intersect each other at one point (the same part of the same player) even when the three-dimensional coordinates of cameras 3A and 3B are different from each other as in FIG. 6A. While the vector lines may be shifted to a certain degree depending on the extraction accuracy of actor regions 400C and 400D, the possibility that vector lines 402A and 402B are extremely separated from each other is low as long as the same person is detected. In view of this, player detector 106 determines that actor region 400C and actor region 400D have the same player when the shortest distance between vector lines 402A and 402B is smaller than the threshold value.

On the other hand, when different players are detected in actor regions 400D and 400E as in FIG. 6B, the parts (401B and 401C) that appear to be the same are obviously located at different coordinates in the three-dimensional space. As a result, vector lines 402B and 402C pass through respective torsional positions, and minimum distance 403B between the vector lines is obviously larger than that of the case where the same player is detected. In view of this, when the shortest distance between vector lines 402B and 402C is equal to or greater than a threshold value, player detector 106 determines that actor region 400D and actor region 400E have different players. For example, in FIG. 6B, a player with uniform number "13" is detected in actor region 400D, and a player with uniform number "33", who has a higher height and is located on near side than the player with uniform number "13", is detected in actor region 400E. In this case, vector line 402C passes through a position obviously higher than that of vector line 402B in the Z-axis direction. As such, it can be seen that the shortest distance between vector line 402B and vector line 402C is large, and different players are detected in actor region 400D and actor region 400E.

Note that player detector 106 may retain actor regions 400 that are determined to have the same player, and may delete actor regions 400 that are determined to have different players. In this manner, the possibility of a situation where different players are erroneously detected as actor regions 400 is reduced, and thus the possibility of a situation where number recognizer 107 recognizes different uniform numbers 500 is reduced. That is, the accuracy of the recognition of the uniform number of the actor is improved.

Details of Number Recognizer

Next, details of number recognizer 107 are described.

Number recognizer 107 recognizes uniform number 500 of the actor from each actor region 400. For example, number recognizer 107 recognizes uniform number 500 of the actor from actor region 400 by using a model configured for uniform number detection (neural network) that has learned images of uniform numbers of a plurality of players through deep learning.

Note that when uniform numbers 500 recognized from actor regions 400 do not match each other, number recognizer 107 may determine uniform number 500 of the actor by majority decision. For example, when four uniform numbers are "13" and two uniform numbers are "10" in uniform numbers 500 recognized from six actor regions 400, number recognizer 107 determines the uniform number "13", whose number of matches, four, is the highest, as the uniform number of the actor.

In addition, number recognizer 107 may perform a two-step process in which the image region of the number is detected first from actor region 400, and then the number itself is recognized from the detected image region.

In addition, number recognizer 107 may calculate, for each actor region 400, likelihoods (e.g., values of 0 to 1) indicating the probabilities of the candidates of recognized uniform numbers to determine the candidate having the largest result of addition of likelihoods as the uniform number of the actor. In the case where the above-described majority decision is adopted, the probability of the recognized numbers does not have an influence on the determination. As such, even when the uniform number "16" recognized from one actor region 400 is 90% correct and the uniform number "10" recognized from two actor regions 400 is 30% correct, the correct uniform number is determined as "10". In view of this, by performing the above-described determination in consideration of the likelihood, the probability of the recognized number can be reflected to the determination of the number.

Process Flow

Next, a process flow in ball game image analysis apparatus 100 is described. The process flow is roughly divided into an action determination process and an actor recognition process.

Action Determination Process

Figure 7:
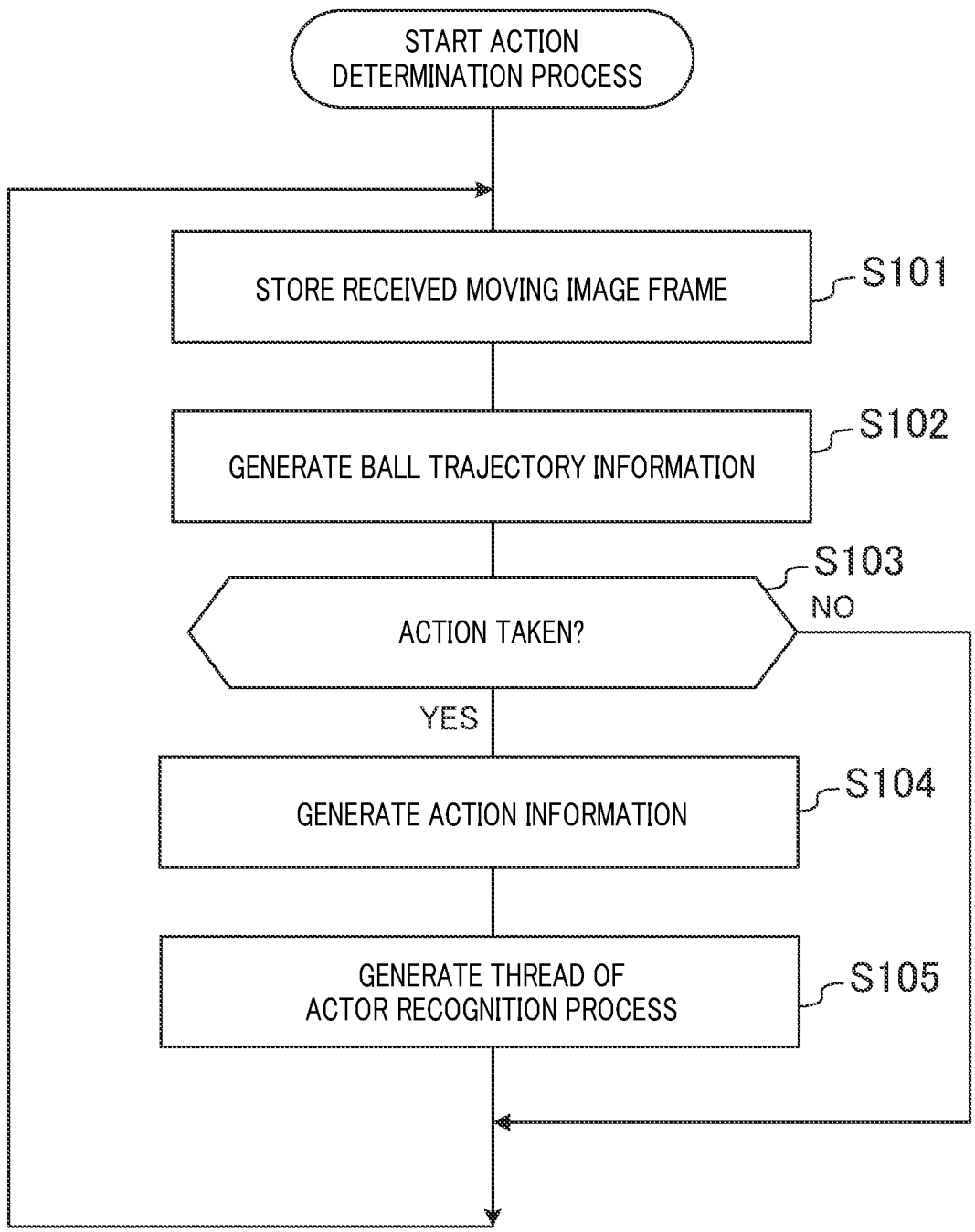
FIG. 7 is a flowchart of an action determination process according to the embodiment.

Next, the action determination process is described with reference to the flowchart illustrated in FIG. 7.

Image receptor 101 receives moving image frame 201 transmitted from each of cameras 3A to 3D, and stores it in storage 109 (S101). From the plurality of moving image frames 201 stored in storage 109, trajectory calculator 102 calculates the three-dimensional position and the speed of the ball at each frame time, and generates ball trajectory information 202 (S102).

Action determiner 103 determines whether an action for the ball has been taken from ball trajectory information 202 (S103). When it is determined that no action has been taken (S103: NO), this flow returns to step S101. When it is determined that an action has been taken (S103: YES), action determiner 103 generates action information 203 (S104), and generates a thread of the actor recognition process (S105). Then, this flow returns to step S101.

Actor Recognition Process

Figure 8:
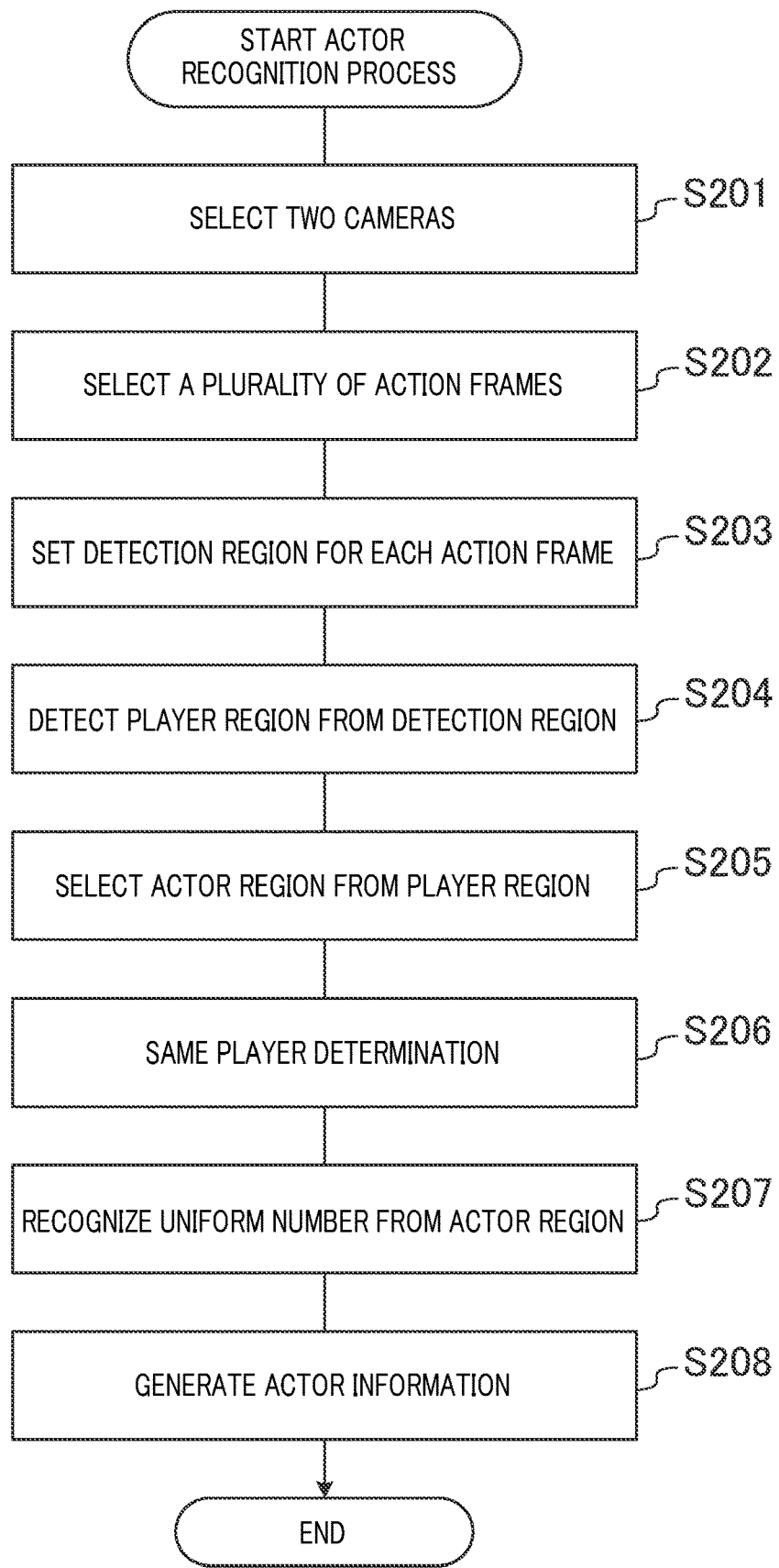
FIG. 8 is a flowchart of an actor recognition process according to the embodiment.

Next, the actor recognition process is described with reference to the flowchart illustrated in FIG. 8. The actor recognition process corresponds to the process of the thread generated at S105 in FIG. 7.

Action frame selector 104 selects at least two cameras 3 on the basis of the position of camera 3 and the three-dimensional position of the ball included in action information 203 (S201).

Next, from moving image frame 201 of each camera 3 selected at S201, action frame selector 104 selects the action frame corresponding to the action frame time and the action frames corresponding to the frame times before and after that action frame time (S202).

Next, detection region setter 105 sets detection region 300 for each action frame selected at S202 (S203).

Next, player detector 106 detects the player region from each detection region 300 set at S203 (S204). Then, player detector 106 selects actor region 400 from among the player regions detected at S204 (S205). Then, player detector 106 performs the same player determination process by using actor region 400 of each camera 3 selected at S201 (S206). Note that the same player determination process may be omitted.

Next, number recognizer 107 recognizes uniform number 500 from each actor region 400, and determines the uniform number of the actor (S207). Note that when the recognized uniform numbers 500 do not match each other, number recognizer 107 determines most numerous uniform number 500 as the uniform number of the actor as described above.

Next, number recognizer 107 generates actor information 204 in which action frame time T and the uniform number of the actor detected at S207 are correlated with each other, and stores it in storage 109 (S208). Then, this flow is terminated (END).

As described above, ball game image analysis apparatus 100 repeatedly executes the action determination process, and when it is determined that an action has been taken, ball game image analysis apparatus 100 generates a thread of the actor recognition process, and recognizes the uniform number of the actor. In this manner, the actor recognition process is executed only when an action has been taken for the ball, and thus the processing load of ball game image analysis apparatus 100 can be reduced.

Overview of Embodiment

In the present embodiment, ball game image analysis apparatus 100 receives moving image frame 201 from cameras 3A to 3D, and calculates the ball trajectory from the plurality of received moving image frames 201. Then, ball game image analysis apparatus 100 determines whether an action has been taken for the ball by the player on the basis of the calculated trajectory change of the ball. Then, when an action has been taken, ball game image analysis apparatus 100 selects, from among the plurality of moving image frames 201, the moving image frame of the timing when the action is taken as the action frame. Then, from the action frame, ball game image analysis apparatus 100 recognizes the player (actor) who has performed the action on the basis of uniform number 500, for example.

In this manner, on the basis of the moving image frame in which the ball game is captured, the player (actor) who has performed the action for the ball can be identified.

In addition, in the present embodiment, detection region 300 corresponding to the three-dimensional position of the ball at the timing at which the action is taken may be set for the above-mentioned action frame, and actor region 400 in which the actor is captured may be detected from that detection region 300, and, the actor may be recognized from that actor region 400.

In this manner, the actor detection process is limited to detection region 300, and the recognition process of uniform number 500 is limited to actor region 400. Accordingly, the processing load can be reduced in comparison with the case where the actor detection process and the uniform number recognition process are performed for the entire moving image frame. Thus, ball game image analysis apparatus 100 can recognize the actor substantially in real time.

The embodiment has been described above.

The functions of ball game image analysis apparatus 100 described in the embodiment can be achieved with a computer program.

Figure 9:
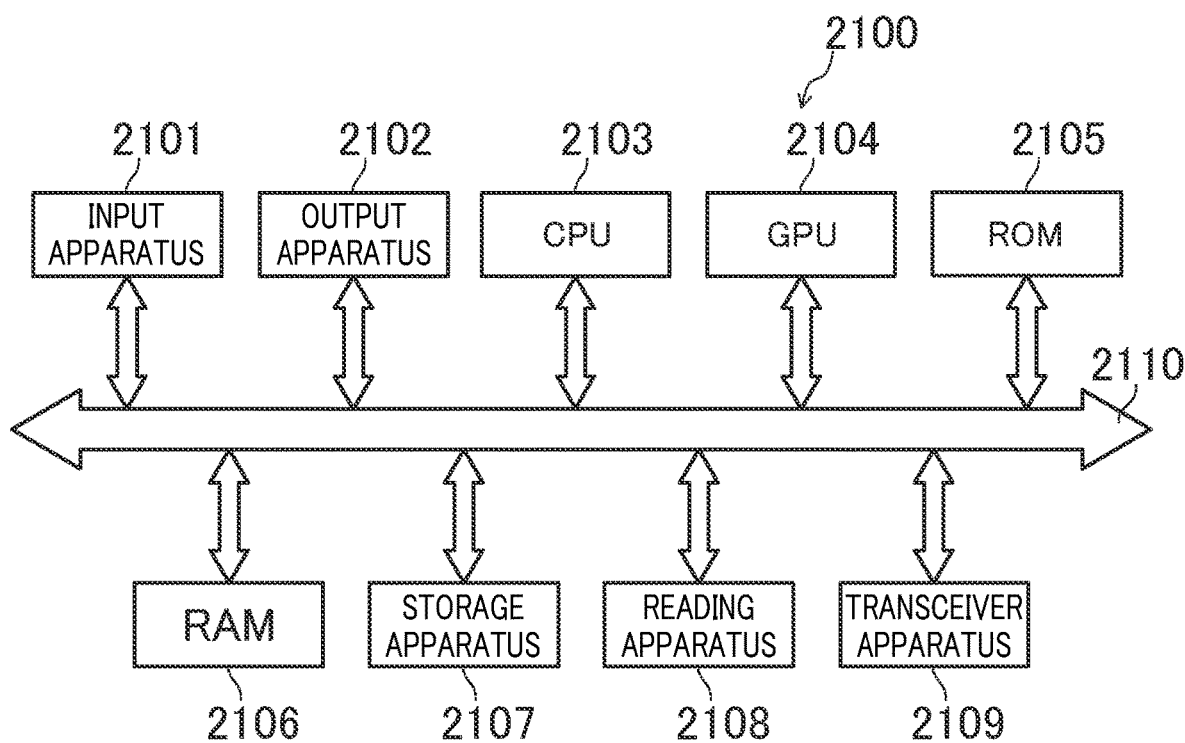
FIG. 9 illustrates an example of a hardware configuration according to the embodiment of the present disclosure.

FIG. 9 illustrates a hardware configuration of a computer that achieves the functions of ball game image analysis apparatus 100 by programs.

Computer 2100 includes input apparatus 2101 (which corresponds to operation apparatus 5) such as a keyboard, a mouse and a touch pad, output apparatus 2102 (which corresponds to display apparatus 4) such as a display and a speaker, central processing unit (CPU) 2103, graphics processing unit (GPU) 2104, read only memory (ROM) 2105, random access memory (RAM) 2106, storage apparatus 2107 such as a hard disk apparatus and a solid state drive (SSD), reading apparatus 2108 that reads information from a recording medium such as a digital versatile disk read only memory (DVD-ROM) and an universal serial bus (USB) memory, and transceiver apparatus 2109 that performs communication through a network. The above-mentioned components are connected by bus 2110.

Reading apparatus 2108 reads a program for achieving the functions of the above-mentioned apparatuses from a recording medium storing the program, and stores it in storage apparatus 2107. Alternatively, transceiver apparatus 2109 communicates with a server apparatus connected to a network to store, in storage apparatus 2107, programs for achieving the functions of the above-mentioned apparatuses downloaded from the server apparatus.

Then, CPU 2103 copies the program stored in storage apparatus 2107 to RAM 2106 and sequentially reads, from RAM 2106, the command included in the program to execute the command, and thus the functions of the above-mentioned apparatuses are achieved.

For example, image receptor 101, trajectory calculator 102, action determiner 103, action frame selector 104, detection region setter 105, player detector 106, number recognizer 107 and result outputter 108 corresponding to the functions of ball game image analysis apparatus 100 may be programs executed by CPU 2103. In addition, storage 109 of ball game image analysis apparatus 100 may be composed of RAM 2106 and/or storage apparatus 2107.

In addition, the functions of the above-mentioned apparatuses may be achieved by executing the command included in the programs at GPU 2104, instead of CPU 2103 having general-purpose functions.

While ball game image analysis system 1 described in the embodiment has a configuration in which camera 3 is connected to ball game image analysis apparatus 100, the configuration of ball game image analysis system 1 is not limited to this. For example, ball game image analysis system 1 may have a configuration further including an apparatus that decomposes a moving image captured by camera 3 into successive still pictures such that the analysis is performed by ball game image analysis apparatus 100 that has received a resulting collection of still pictures decomposed by that apparatus. In this case, the above-described "moving image frame" corresponds to one decomposed still picture. Specifically, "moving image frame" in this specification may be obtained by directly analyzing a moving image provided from camera 3, or may be still pictures correlated with frame times provided from an apparatus other than ball game image analysis apparatus 100.

In addition, while ball game image analysis apparatus 100 determines that an action has been taken when the trajectory change matches a predetermined condition in the embodiment, it also possible to determine that an action has been taken when the trajectory change is obviously against the physical law. For example, when a ball in the air deviates from a parabolic trajectory before it makes contact with the ground, it is determined that some kind of action has been taken. In addition, the determination of occurrence of action may be made in consideration of both the determination whether the trajectory change is against the physical law and the determination whether it matches a specific pattern.

In addition, while ball game image analysis apparatus 100 recognizes uniform number 500 of the actor in the embodiment, this is merely an exemplary way for identifying the actor related to the action. Information other than the uniform number may be used as long as the actor can be finally recognized. For example, in the case where the actor faces camera 3, the actor can be identified through facial recognition even without using the uniform number. Naturally, even when facial recognition is used, the uniform number may be used for the purpose of improving the recognition accuracy. In view of this, number recognizer 107 may be referred to as "actor recognizer".

In addition, each function used for the explanation in the embodiment may be achieved as an LSI, which is an integrated circuit. Such elements may be each individually provided as one chip, or may be provided as one chip including a part or all of them. Here, the LSI described above may also be called an IC, a system LSI, a super LSI, or an ultra LSI depending on the integration density.

In addition, the way of achieving the integrated circuit is not limited to LSIs, and may also be achieved with a dedicated circuit or a general-purpose processor. It is also possible to use a field programmable gate array (FPGA) that is programmable after the production of an LSI, or a reconfigurable processor that can reconfigure the setting or the connection of a circuit cell inside an LSI.

Furthermore, if a technology for integrated circuits that replaces LSIs appears along with advancements in semiconductor technology or other derivative technologies, such technology may naturally be used to integrate functional blocks. Biotechnologies could be applied, for example.

This application is entitled to and claims the benefit of Japanese Patent Application No. 2018-097086 filed on May 21, 2018, the disclosure each of which including the specification, drawings and abstract is incorporated herein by reference in its entirety.

INDUSTRIAL APPLICABILITY

The present disclosure is applicable to an apparatus and a method for analyzing a sports game.

REFERENCE SIGNS LIST

3, 3A, 3B, 3C and 3D Camera
1 Ball game image analysis system
4 Display apparatus
5 Operation apparatus
100 Ball game image analysis apparatus
101 Image receptor
102 Trajectory calculator
103 Action determiner
104 Action frame selector
105 Detection region setter
106 Player detector
107 Number recognizer
108 Result outputter
109 Storage

The invention claimed is:

1. A ball game image analysis apparatus that analyzes an image of a ball game, the ball game image analysis apparatus comprising:
    an image receptor that receives a plurality of moving image frames of the ball game captured by a plurality of cameras located at different positions, the plurality of moving image frames being two-dimensional image frames;
    a trajectory calculator that calculates a trajectory of a moving body for the ball game by using the plurality of moving image frames;
    an action determiner that determines whether an action is taken for the moving body by a player of the ball game on a basis of a change of the trajectory of the moving body;
    an action frame selector that selects, as a two-dimensional action frame, a moving image frame of a timing when the action is taken from among the plurality of moving image frames, when the action is taken;
    a detection region setter that sets, in the two-dimensional action frame, a detection region corresponding to a three-dimensional position of the moving body at the timing when the action is taken,
    a player detector that detects, from the detection region, an actor region in which the player who has performed the action is captured, and
    an actor recognizer that recognizes, from the actor region of the action frame, a player who has performed the action, wherein
    the detection region setter switches a relative position of the detection region to the position of the moving object in the two-dimensional action frame, according to the three-dimensional position of the moving object.

2. The ball game image analysis apparatus according to claim 1,
    wherein when a height of the three-dimensional position of the moving body at the timing when the action is taken is equal to or greater than a predetermined threshold value, the detection region setter sets the detection region such that an image of the moving body is located at an upper end of the detection region, and wherein when the height of the three-dimensional position of the moving body at the timing when the action is taken is smaller than the predetermined threshold value, the detection region setter sets the detection region such that the image of the moving body is located at a center of the detection region.

3. The ball game image analysis apparatus according to claim 1, wherein the action frame selector selects a moving image frame corresponding to the timing when the action is taken as a first action frame, and selects a moving image frame corresponding to a timing different from that of the first action frame as a second action frame.

4. The ball game image analysis apparatus according to claim 3,
wherein when a plurality of regions in which the player is captured is detected from a detection region set in the first action frame, the player detector selects a region closest to a position of the moving body at the timing as the actor region, and
wherein when a plurality of regions in which the player is captured is detected from a detection region set in the second action frame, the player detector selects a region closest to the actor region of the first action frame as the actor region.

5. The ball game image analysis apparatus according to claim 1, wherein the action frame selector selects the action frame from moving image frames captured by least two cameras located at positions closer to a three-dimensional position of the moving body at the timing when the action is taken.

6. The ball game image analysis apparatus according to claim 1, wherein the actor recognizer recognizes a uniform number of the player who has performed the action to recognize the player who has performed the action.

7. A ball game image analysis method of analyzing an image of a ball game, the method comprising:
receiving a plurality of moving image frames of the ball game captured by a plurality of cameras located at different positions, the plurality of moving image frames being two-dimensional image frames;
calculating a trajectory of a three-dimensional position of a moving body for the ball game by using the plurality of moving image frames;
determining whether an action is taken for the moving body by a player of the ball game on a basis of a change of the trajectory of the moving body;
selecting, as a two-dimensional action frame, a moving image frame of a timing when the action is taken from among the plurality of moving image frames, when the action is taken;
setting, in the two-dimensional action frame, a detection region corresponding to a three-dimensional position of the moving body at the timing when the action is taken;
detecting, from the detection region, an actor region in which the player who has performed the action is captured, and
recognizing, from the actor region of the action frame, a player who has performed the action, wherein
switching, in the setting of the detection region, a relative position of the detection region to the position of the moving object in the two-dimensional action frame, according to the three-dimensional position of the moving object.

* * * * *